US012316043B2

(12) United States Patent
Zheng et al.

(10) Patent No.: US 12,316,043 B2
(45) Date of Patent: May 27, 2025

(54) ELECTRICAL CONNECTOR AND CONNECTOR ASSEMBLY INCLUDING THE SAME

(71) Applicant: T-CONN PRECISION (ZHONGSHAN) CO., LTD, Guangdong (CN)

(72) Inventors: Jia-Heng Zheng, Guangdong (CN); Dong Xing, Guangdong (CN); Wu-Lin Liu, Guangdong (CN)

(73) Assignee: T-CONN PRECISION (ZHONGSHAN) CO., LTD, Guangdong (CN)

( * ) Notice: Subject to any disclaimer, the term of this patent is extended or adjusted under 35 U.S.C. 154(b) by 379 days.

(21) Appl. No.: 17/834,556

(22) Filed: Jun. 7, 2022

(65) Prior Publication Data

US 2023/0299533 A1 Sep. 21, 2023

(30) Foreign Application Priority Data

Mar. 21, 2022 (CN) ......................... 202210277600.7

(51) Int. Cl.

*H01R 13/50* (2006.01)
*H01R 13/24* (2006.01)
*H01R 13/62* (2006.01)

(52) U.S. Cl.

CPC ......... *H01R 13/50* (2013.01); *H01R 13/2471* (2013.01); *H01R 13/6205* (2013.01)

(58) Field of Classification Search

CPC ........ H01R 24/84; H01R 13/02; H01R 24/00; H01R 13/40; H01R 13/50; H01R 13/2471; H01R 13/6205

See application file for complete search history.

(56) References Cited

U.S. PATENT DOCUMENTS 5,355,274 A * 10/1994 Marach ................ H01H 85/547 361/833

FOREIGN PATENT DOCUMENTS

CN 111786200 A * 10/2020 ........... H01R 12/716
KR 200347660 Y1 * 4/2004

* cited by examiner

*Primary Examiner* — Jean F Duverne
(74) *Attorney, Agent, or Firm* — Birch, Stewart, Kolasch & Birch, LLP

(57) ABSTRACT

An electrical connector has a base, and at least one male terminal, at least one female terminal and multiple conductive sheets mounted in the base. The at least one female terminal is configured to be connected with the at least one male terminal of another electrical connector. A connector assembly includes two said electrical connectors. Each one of the electrical connectors is configured to be connected with the other one of the electrical connectors. Since it needs only one mold to manufacture the two electrical connectors for two different purposes, manufacturing cost for the two electrical connectors of the connector assembly can be greatly reduced.

9 Claims, 5 Drawing Sheets

ELECTRICAL CONNECTOR AND CONNECTOR ASSEMBLY INCLUDING THE SAME

BACKGROUND OF THE INVENTION

1. Field of the Invention

The present invention relates to an electrical connector, especially to an electrical connector and a connector assembly including the electrical connectors.

2. Description of the Prior Art(s)

A conventional connector assembly includes a male connector and a female connector. The male connector is used to be inserted into the female connector for electrical connection. In order to the need for insertion, the male connector and the female connector have different shapes and structures. Consequently, it needs two molds and different production lines for manufacturing the male connector and the female connector, causing high manufacturing cost.

To overcome the shortcomings, the present invention provides an electrical connector and a connector assembly including the electrical connectors to mitigate or obviate the aforementioned problems.

SUMMARY OF THE INVENTION

The main objective of the present invention is to provide an electrical connector that has a base, at least one male terminal mounted in the base, at least one female terminal mounted in the base, and multiple conductive sheets mounted on the base. The at least one male terminal is mounted through the base, and each of the at least one male terminal has a first end and a second end. The first and second ends of the male terminal protrude out of the base. The at least one female terminal is disposed beside and matching the at least one male terminal. The at least one female terminal is mounted through the base, and each of the at least one female terminal has a first end and a second end. The first end of the female terminal is positioned toward the first end of the at least one male terminal and protrudes out of the base. The conductive sheets contact with the first end of the at least one female terminal and the first end of the at least one male terminal respectively. The at least one female terminal is configured to be connected with the at least one male terminal of another electrical connector.

The main objective of the present invention is to provide a connector assembly that includes two said electrical connectors. Each one of the electrical connectors is configured to be connected with the other one of the electrical connectors.

Since it needs only one mold to manufacture the two electrical connectors for two different purposes, manufacturing cost for the two electrical connectors of the connector assembly can be greatly reduced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
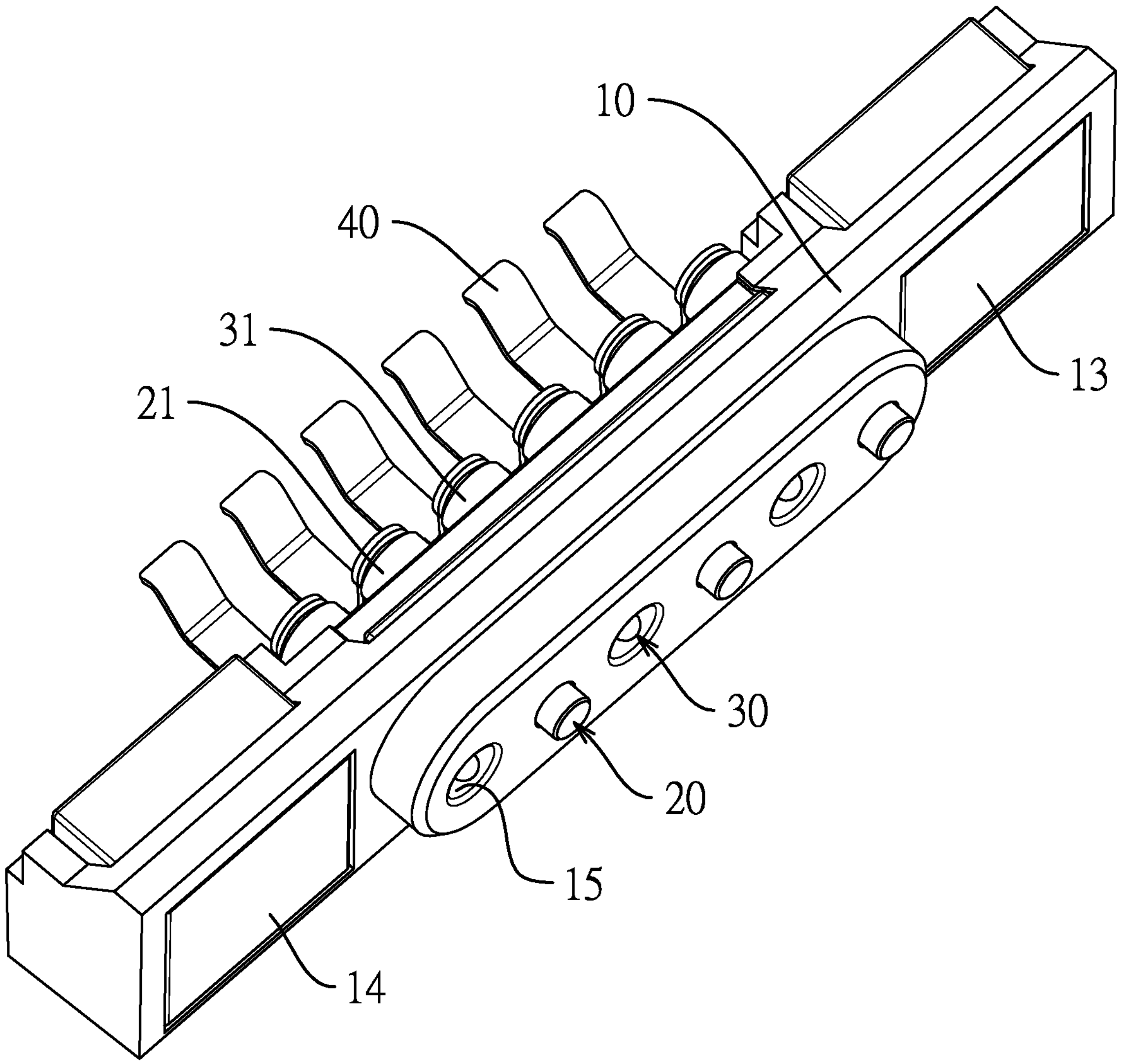
FIG. 1 is a perspective view of an electrical connector in accordance with the present invention.

With reference to FIG. 1, an electrical connector in accordance with the present invention comprises a base 10, at least one male terminal 20, and at least one female terminal 30.

Figure 2:
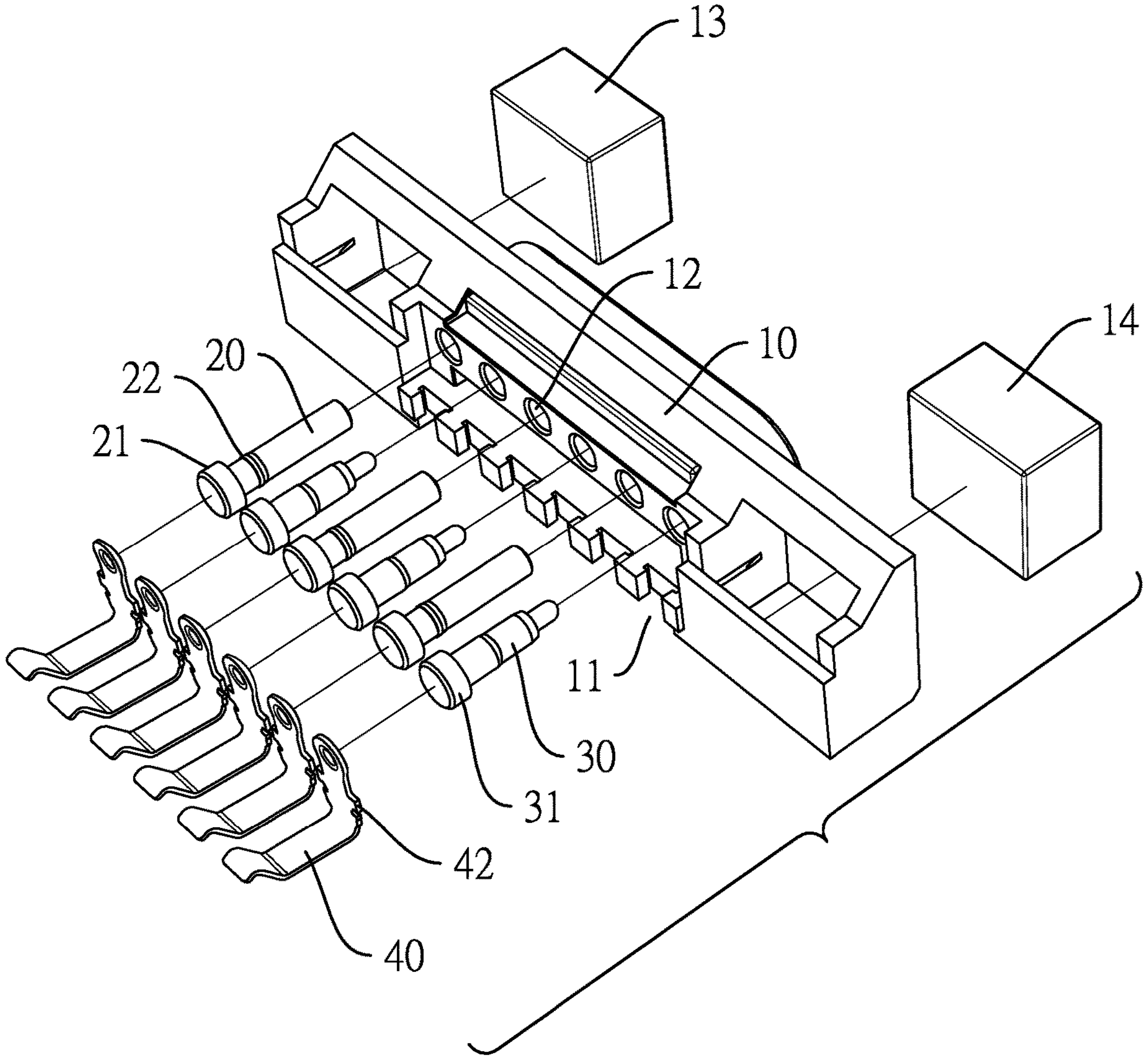
FIG. 2 is an exploded perspective view of the electrical connector in FIG. 1.
Figure 3:
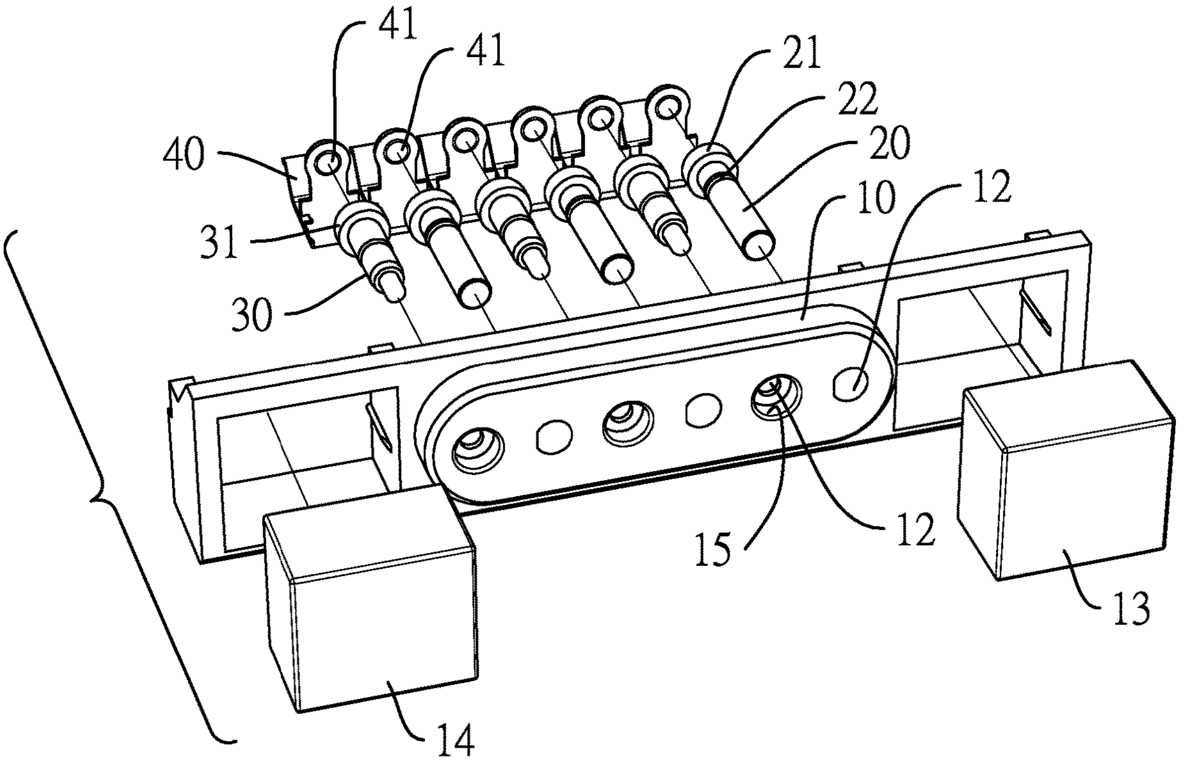
FIG. 3 is another exploded perspective view of the electrical connector in FIG. 1.

With further reference to FIGS. 2 and 3, the base 10 is elongated and has two opposite ends, multiple through holes 12, a first magnetic component 13, and a second magnetic component 14. The through holes 12 are separately formed through the base 10 and are linearly arranged between the two opposite ends of the base 10. The first magnetic component 13 and the second magnetic component 14 are mounted in the two opposite ends of the base 10 and have opposite poles. Thus, when two of the electrical connectors that are symmetrically disposed, the first magnetic component 13 of one of the electrical connectors attracts the second magnetic component 14 of the other one of the electrical connectors, such that the male and female terminals 20, 30 of the one of the electrical connectors can be quickly connected with the female and male terminals 30, 20 of the other one of the electrical connectors to form a connector assembly in accordance with the present invention.

Figure 4:
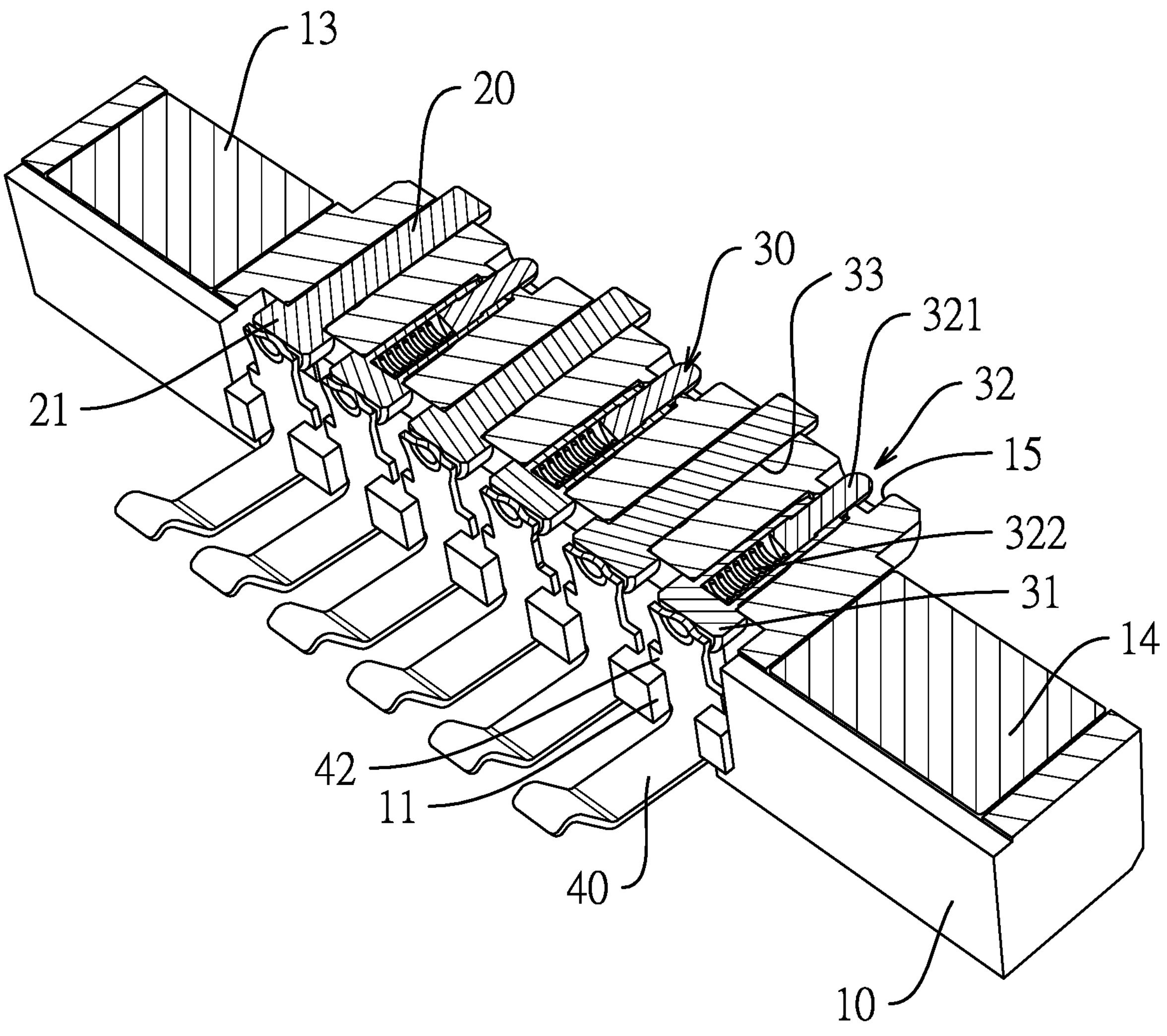
FIG. 4 is a cross-sectional perspective view of the electrical connector in FIG. 1.

With further reference to FIG. 4, the at least one male terminal 20 is mounted in the base 10. Specifically, the at least one male terminal 20 is mounted in at least one of the through holes 12 of the base 10. The at least one female terminal 30 is mounted in at least one of the through holes 12 of the base 10. Each of the at least one male terminal 20 has an annular protrusion 22 formed on an outer surface of the male terminal 20. The annular protrusion 22 of the male terminal 20 abuts against an inner surface defined around a respective one of the through holes 12, such that the male terminal 20 is tightly fitted in the respective one of the through holes 12.

Figure 5:
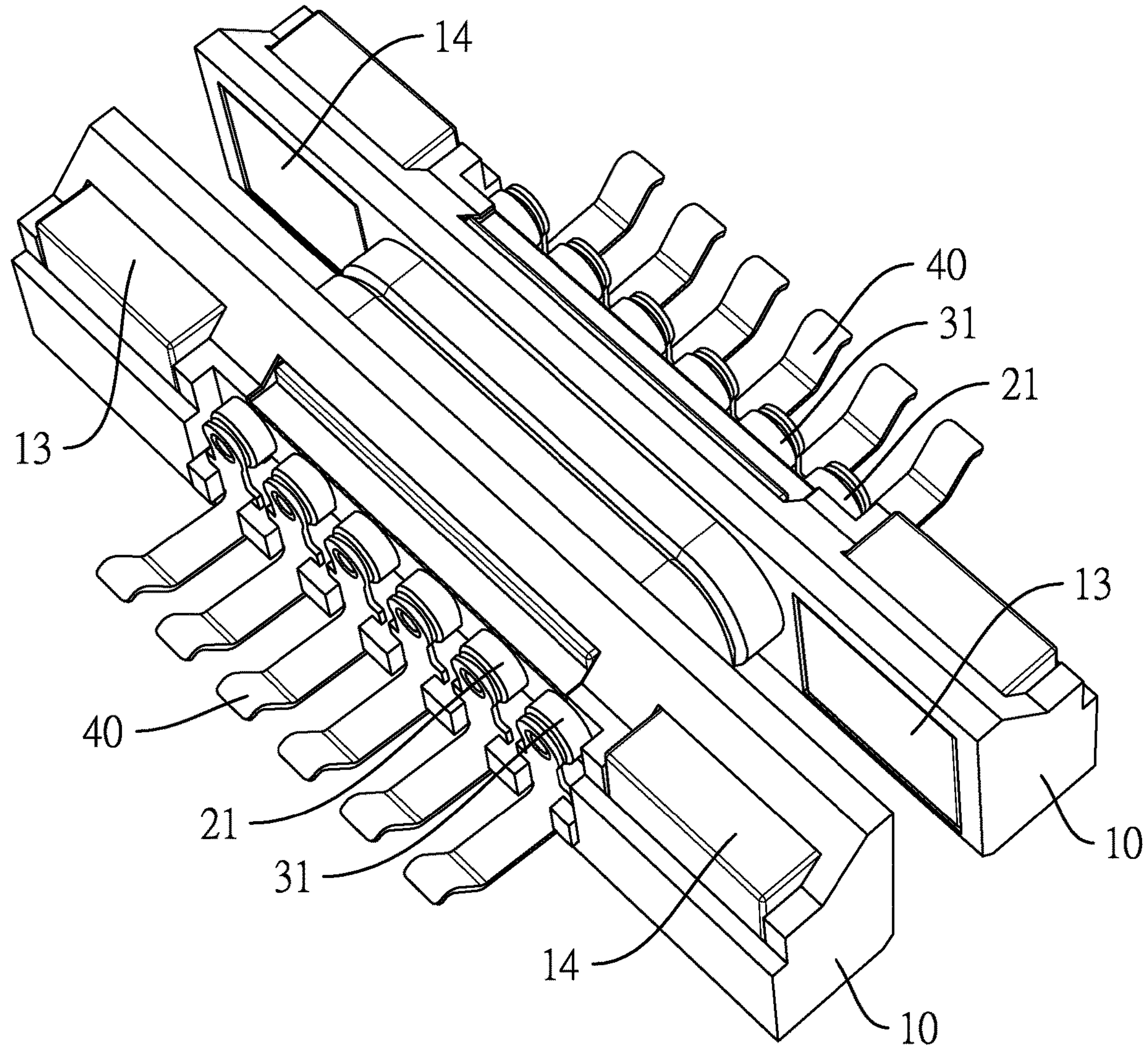
FIG. 5 is a perspective view of a connector assembly in accordance with the present invention.

With further reference to FIG. 5, the at least one female terminal 30 is mounted in the base 10, and is disposed beside and matches the at least one male terminal 20. Specifically, the at least one female terminal 30 is mounted in at least one of the through holes 12 of the base 10. Thus, the at least one female terminal 30 is configured to be connected with the at least one male terminal 20 of another electrical connector. Similarly, the at least one male terminal 20 is able to be connected with the at least one female terminal 30 of said another electrical connector.

Specifically, the base 10 is formed by injection molding process. With the through hole 12 separately formed in the base 10, the at least one male terminal 20 and the at least one female terminal 30 are electrically insulated.

With the above-mentioned structure, the electrical connector of the present invention can be used as a male connector or a female connector. It can be understood that the electrical connector is used as a male connector when being inserted in one direction, and the electrical connector may be used as a female connector by being flipped 180 degrees. By connecting two electrical connectors of the present invention, the connector assembly in accordance with the present invention for electrical connection is accomplished. It needs only one mold to manufacture the two electrical connectors for two different purposes. Accordingly, manufacturing cost for the two electrical connectors of the connector assembly is greatly reduced and it is easy to connect the two electrical connectors.

As shown in FIGS. 1 to 3, in the preferred embodiment, the at least one male terminal 20 includes a plurality of male terminals 20 and the at least one female terminal 30 also includes a plurality of female terminals 30. A number of the male terminals 20 and a number of the female terminals 30 are the same. The male terminal 20 and the female terminal 30 are linearly arranged alternately. The number of the male terminals 20 and the number of the female terminals 30 may be decided according to requirements for use. In this way, the male terminals 20 and the female terminals 30 of one electrical connector can be connected with the female terminals 30 and the male terminals 20 of the other electrical connector.

With further reference to FIG. 3, furthermore, the male terminals 20 are mounted through the base 10. Each of the male terminals 20 has a first end and a second end. The first and second ends of the male terminal 20 protrude out of the base 10. The female terminals 30 are mounted through the base 10. Each of the female terminals 30 has a first end and a second end. The first end of the female terminal 30 is positioned toward the first end of the male terminal 20 and protrudes out of the base 10. The electrical connector further comprises multiple conductive sheet 40. The conductive sheets 40 are mounted on the base 10 and contact with the first ends of the female terminals 30 and the first ends of the male terminals 20 respectively. It can be understood that the conductive sheets 40 are used for connecting external electrical devices. The second end of each of the male terminals 20 protrudes out of the base 10 for connecting with the female terminal 30 of said another electrical connector. Correspondingly, the second end of each of the female terminals 30 protrudes out of the base 10 for connecting with the male terminal 20 of said another electrical connector.

Specifically, each of the male terminals 20 has a contact pad 21 disposed on the first end of the male terminal 20. Each of the female terminals 30 has a contact pad 31 disposed on the first end of the female terminal 30. Each of the conductive sheets 40 is resilient and has a conductive bump 41. The conductive bump 41 protrudes toward and resiliently contacts with a respective one of the contact pads 21, 31. The conductive bump 41 and the contact pads 21, 31 of the male and female terminals 20, 30 ensure good electrical connection between the conductive sheets 40 and the male terminals 20 and between the conductive sheet 40 and the female terminals 30.

It should be noted that when the conductive sheets 40, the male terminals 20 and the female terminals 30 are assembled on the base 10, the conductive sheets 40 are resilient deformed, such that the conductive bump 41 of each of the conductive sheets 40 resiliently contacts with the respective one of the contact pads 21, 31 in a restoring direction. It should be noted that in addition to form the conductive bump 41, the conductive sheets 40 may be connected with the contact pads 21, 31 of the male and female terminals 20, 30 by riveting or soldering.

Specifically, the base 10 further has multiple positioning slots 11 separately formed through the base 10. The conductive sheets 40 are mounted in the positioning slots 11 respectively. Each of the conductive sheets 40 has a limiting protrusion 42. The limiting protrusion 42 engages in a respective one of the positioning slots 11, so as to prevent the conductive sheets 40 from moving relative to the base 10 in the positioning slots 11.

Each of the at least one female terminal 30 is provided with a conductive resilient structure 32. With the conductive structures 32, the at least one male terminal 20 is forced to keeps contact with the at least one female terminal 30 of said another electrical connector.

Specifically, the base 10 further has at least one insertion recess 15. The at least one insertion recess 15 is formed in an outer surface of the base 10 and corresponds in position to at least one of the through holes 12 that is for mounting the at least one female terminal 30. Each of the at least one female terminal 30 includes a mounting recess 33 formed in the second end of the female terminal 30. The conductive resilient structure 32 includes a conductive pin 321 and a resilient element 322. The conductive pin 321 is mounted in the mounting recess 33 and protrudes out of the base 10 through a corresponding one of the at least one insertion recess 15. The resilient element 322 is mounted in the mounting recess 33 and is disposed between the conductive pin 321 and the first end of the female terminal 33. The resilient element 322 resiliently pushes the conductive pin 321 to protrude out of the second end of the female terminal 30 and the base 10. Thus, the at least one male terminal 20 of said another electrical connector may be inserted in a corresponding one of the at least one insertion recess 15 of the base 10, so as to abut against the conductive pin 321 in a respective one of the at least one female terminal 30.

The electrical connector and the connector assembly including the electrical connectors as described has the following advantages. Since it needs only one mold to manufacture the two electrical connectors for two different purposes, manufacturing cost for the two electrical connectors of the connector assembly can be greatly reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrical connector comprising:

a base;

at least one male terminal mounted in the base, the at least one male terminal mounted through the base, each of the at least one male terminal having a first end and a second end, and the first and second ends of the male terminal protruding out of the base;

at least one female terminal mounted in the base and disposed beside and matching the at least one male terminal, the at least one female terminal mounted through the base, each of the at least one female terminal having a first end and a second end, and the first end of the female terminal positioned toward the first end of the at least one male terminal and protruding out of the base, wherein the at least one female terminal is configured to be connected with the at least one male terminal of another electrical connector; and multiple conductive sheets mounted on the base and contacting with the first end of the at least one female terminal and the first end of the at least one male terminal respectively.

2. The electrical connector as claimed in claim 1, wherein the at least one male terminal includes a plurality of male terminals; and the at least one female terminal includes a plurality of female terminals;

wherein a number of the male terminals and a number of the female terminals are the same, and the male terminals and the female terminals are arranged alternately.

3. The electrical connector as claimed in claim 1, wherein each of the at least one male terminal has a contact pad disposed on the first end of the male terminal;

each of the at least one female terminal has a contact pad disposed on the first end of the female terminal; and each of the conductive sheets is resilient and has a conductive bump protruding toward and resiliently contacting with a respective one of the contact pads.

4. The electrical connector as claimed in claim 1, wherein the base further has multiple positioning slots separately formed through the base; and the conductive sheets are mounted in the positioning slots respectively, and each of the conductive sheets has a limiting protrusion engaging in a respective one of the positioning slots.

5. The electrical connector as claimed in claim 1, wherein the base has multiple through holes separately formed through the base;

the at least one male terminal is mounted in at least one of the through holes of the base, each of the at least one male terminal has an annular protrusion formed on an outer surface of the male terminal, and the annular protrusion of the male terminal abuts against an inner surface defined around a respective one of the through holes; and the at least one female terminal is mounted in at least one of the through holes of the base.

6. The electrical connector as claimed in claim 1, wherein each of the at least one female terminal is provided with a conductive resilient structure, and the conductive resilient structure forces the at least one male terminal to keep contact with the at least one female terminal of said another electrical connector.

7. The electrical connector as claimed in claim 6, wherein the base further has at least one insertion recess formed in an outer surface of the base and corresponding in position to at least one of the through holes that is for mounting the at least one female terminal;

each of the at least one female terminal includes a mounting recess formed in the second end of the female terminal;

the conductive resilient structure includes a conductive pin mounted in the mounting recess and protruding out of the base through a corresponding one of the at least one insertion recess; and a resilient element mounted in the mounting recess and disposed between the conductive pin and the first end of the female terminal; and the resilient element resiliently pushes the conductive pin to protrude out of the second end of the female terminal and the base.

8. The electrical connector as claimed in claim 1, wherein the base is elongated and has two opposite ends, a first magnetic component and a second magnetic component; and the first magnetic component and the second magnetic component are mounted in the two opposite ends of the base and have opposite poles.

9. A connector assembly including two electrical connectors as claimed in claim 1, and each one of the electrical connectors is configured to be connected with the other one of the electrical connectors.

* * * * *